May 12, 1953   O. G. LANDSVERK ET AL   2,638,552
RADIATION EXPOSURE METER
Filed Dec. 5, 1949
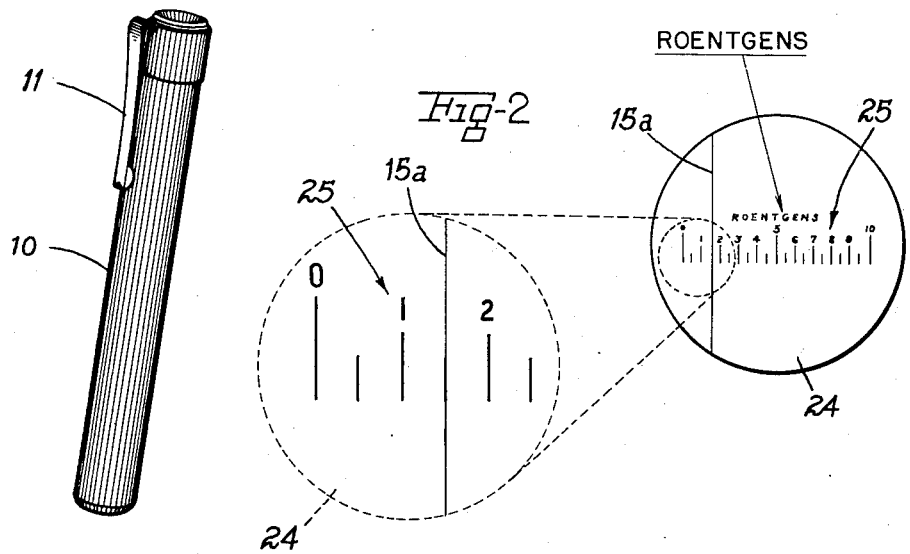
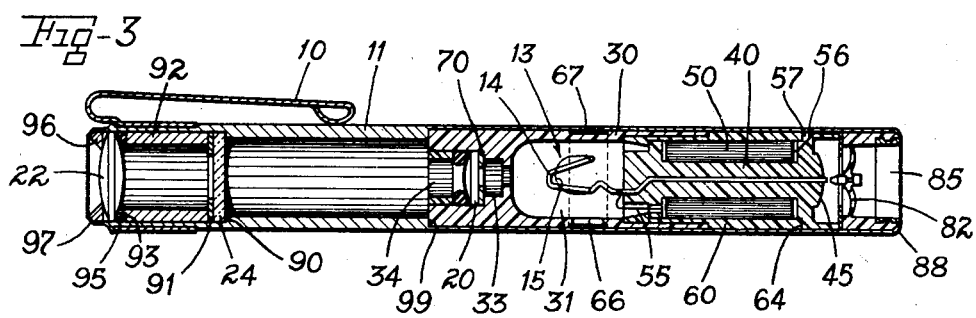
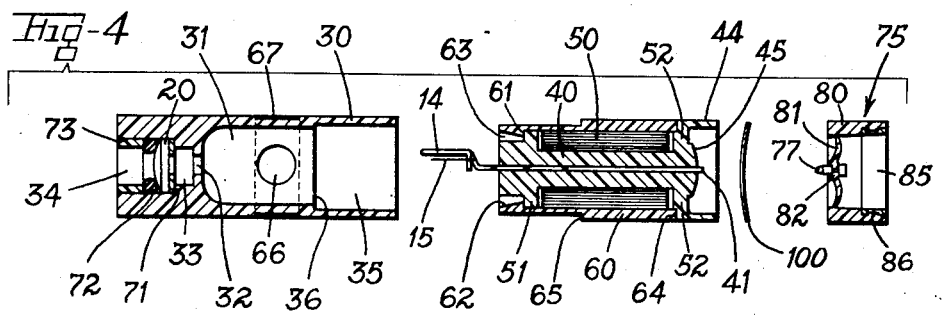
INVENTORS
Ole G. Landsverk and
BY Leonard E. Rasmussen
Marechal & Biebel
ATTORNEYS Patented May 12, 1953

2,638,552

UNITED STATES PATENT OFFICE 2,638,552

RADIATION EXPOSURE METER

Ole G. Landsverk and Leonard E. Rasmussen, Cincinnati, Ohio, assignors to Keleket X-Ray Corporation, a corporation of Ohio Application December 5, 1949, Serial No. 131,092

7 Claims. (Cl. 250—83.3)

This invention relates to devices for measuring radioactivity, and more particularly to instruments which include an electrometer for measuring the amount of exposure to radiation such as X-rays or gamma radiation by determining the ionization caused by the radiation to be measured and its resulting effect on the electrometer.

In connection with work having to do with radioactive materials and the like, it is highly important to provide proper protection for the personnel who are subjected to such radiation. Experience has shown that there is a maximum permissible amount of radiation to which individuals may safely be subjected in any period of time, while exposure in excess of that amount is dangerous, and it is important both to prevent it if possible and also to know promptly if it has inadvertently occurred in order that immediate consideration may be given to corrective treatment.

It is desirable, therefore, to provide a suitable integrating type of radiation sensitive device which may be carried directly upon the person of the individual who is engaged in this type of work, so that it will be carried by him constantly and thus subjected to the same radiation conditions to which he is subjected. By suitably calibrating the instrument, it thus becomes possible to ascertain at any time the total effective amount of radiation to which he has been subjected, and by proper periodic checks to guard and protect him against excessive exposure, or to give prompt attention to corrective treatment, when the instrument indicates that he has reached or exceeded the maximum permissible amount of exposure for a given time interval.

It is accordingly important in such an instrument that it be light in weight, convenient to carry, relatively strong and rugged in construction and operation, making it possible for the user to carry it much as he would an instrument such as a fountain pen or the like, and without requiring conscious thought on his part, and with adequate assurance that when so carried and constantly associated with the wearer, it will properly integrate and indicate the summation of the radiation conditions to which he has been subjected. It is also desirable with an instrument for this purpose that it have a measuring capacity which is substantially in excess of a critical amount of exposure, which may be a lethal amount or the normally tolerable amount for a given period of time, such as a day or a week, in order that the user can determine his approach to such critical amount of exposure well before the measuring capacity of the instrument has been exceeded.

A suitable device for this purpose includes an electrometer, such as a quartz fiber electrometer, which may be mounted in a tube or other suitable housing provided with a microscope and a scale for observing and measuring the movements of the fiber resulting from variation in the charge thereon. In the use of such an instrument, it is first charged by application of a predetermined electrical charge to the electrometer, causing a deflection of the fiber to occur to a position which may be conveniently indicated as a zero reading on the scale. When the device is subjected to X- or gamma radiation, the resulting ionization causes dissipation of the charge on the electrometer, and this in turn causes deflection of the fiber which is observed and measured upon the scale. Thus as the charge is progressively lost due to prolonged exposure to X- or gamma radiation, the fiber increasingly deflects towards the position it occupies in the absence of such charge, and thus the reading of the scale increases in accordance with the amount of radiation to which the user has been exposed since the device was charged.

In a measuring instrument of this character, the sensitivity of the instrument, and hence the total amount of radiation which it can measure, depend upon several factors. One factor is the volume of the ionization chamber surrounding the electrometer, a second factor is the optimum charging voltage for linear response, and a third factor is the total voltage drop in the discharge of the electrometer which produces movement of the fiber through the full length of the scale, these latter factors being also influenced by the magnifying power of the microscope for observing the fiber, the stiffness of the fiber itself and also the actual length of the scale. A further factor influencing the sensitivity of the instrument is the electrical capacity of the electrometer system, increase in capacity producing an increase in the amount of radiation required to cause a given voltage drop.

One of the principal objects of the present invention is to provide an instrument of the above character for measuring exposure to X- or gamma radiation which is comparatively simple to construct in small and lightweight form for ready attaching to the clothes of the user, which will measure a range of radiation substantially in excess of the accepted normal tolerance for a person, which is accurate and dependable in operation over a wide range of temperature conditions and is capable of successfully withstanding considerable shock, and which may be readily hermetically sealed to assure maintenance of its accuracy even when immersed in water or other conducting fluid.

Another object is to provide such a device having an electrometer equipped with a condenser for increasing its capacity and having also a microscope for observing the electrometer fiber wherein the electrometer and condenser are assembled in properly spaced and fixed relation with the objective lens of the microscope in the ionization chamber before these parts are mounted in the tube or other housing of the device and thus to facilitate obtaining and retaining the proper focused relation of the microscope and electrometer for accurate reading of the device.

It is also an object of the invention to provide such a measuring device wherein an insulator which supports the electrometer includes a spool portion on which the condenser is wound and also includes a lens surface for concentrating the light entering the housing upon the electrometer fiber to facilitate proper observing and reading of the movements of the fiber.

Other objects and advantages of the invention will be apparent from the following description, the accompanying drawing and the appended claims.

In the drawing—

Fig. 1 is a perspective view of a radiation exposure measuring device constructed in accordance with the invention;

Fig. 2 is a somewhat diagrammatic view showing the image visible to the user of the device and including an enlarged fragment of the image for clarity of illustration;

Fig. 3 is a view of the device in longitudinal section and on an enlarged scale; and Fig. 4 is an exploded sectional view of certain of the component parts of the device taken at right angles to Fig. 3.

Referring to the drawing, which illustrates a preferred embodiment of the invention, the housing of the device is a barrel 10 of a material which will freely transmit the radiation to be measured. The barrel 10 is of approximately the same size and shape as a conventional fountain pen, and it is provided with a clip 11 for mounting the device in the pocket of the user, the ring portion of clip 11 being set in a circumferential groove in the barrel as shown in Fig. 3. As an example of suitable dimensions for the device, satisfactory results have been obtained with the barrel 10 formed of a tube of anodized aluminum approximately 3.9 inches in length and one-half inch in diameter, the dimensions of the other parts in the drawing being shown as in proportion to this size of tube. Within the barrel 10 is the electrometer 13, which comprises an electrode 14 of Phosphor bronze or other suitable conducting material supporting a quartz fiber 15 soldered or otherwise secured thereto and provided with a conducting coating such as a sputtered coating of platinum. The microscope includes an objective lens 20 and an eyepiece 22, and a glass disk 24 having scale designations 25 thereon is positioned between these lenses for measuring the position of fiber 15 as viewed through the microscope, the scale being shown in Fig. 2 as covering a range of 10 roentgens.

The electrometer 13 and the objective lens 20 are mounted in fixed relation as part of a unitary subassembly within a separately formed housing 30 which forms an ionization chamber 31 for the electrometer. Three connecting passages 32, 33 and 34 of progressively greater diameter lead from the chamber 31 in the direction of the microscope, and at the opposite end of chamber 31, and the housing 30 is formed with a large bore 35 terminating in an annular shoulder 36. It is desirable that the proportions of the housing 30 and chamber 31 and the average atomic number of the materials forming the walls of the chamber be such as to satisfy the Bragg-Gray conditions for an "air-wall" chamber, and satisfactory results from this standpoint have been obtained with the housing 30 formed of a molded plastic material such as black polystyrene.

An insulator 40 is mounted within housing 30 and supports the electrometer 13 within the ionization chamber 31. This insulator also transmits light from the end of the barrel 10 for illuminating the electrometer, and it is desirable that the insulating properties of the insulator 40 be high, and also that the insulator transmit as much light as possible from the end of the barrel for illuminating the electrometer. Satisfactory results from the standpoint of both insulating and light transmitting properties have been obtained in a device as illustrated having a range of 10 roentgens with this insulator molded from transparent polystyrene, and the electrode 14 includes angularly arranged portions as shown in Fig. 3 around which the insulator may be molded to provide for rigidly supporting the electrometer. The outer end 41 of the electrode projects beyond the outer end of the insulator to provide a charging connection for the electrometer, and this end portion of the insulator includes a tubular outer portion 44 proportioned to engage the inner surface of barrel 10 and an inner portion having a convex lens surface 45 formed thereon.

In addition to supporting the electrometer, the insulator 40 forms a spool on which is mounted a tubular condenser 50, the insulator having an elongated circumferential groove which receives the condenser between the shoulders 51 and 52 at each end of this groove. For an instrument designed to measure over a range of 10 roentgens, satisfactory results have been obtained with a condenser having a capacitance of about 60 mmfd. and with polystyrene foil employed as the insulating material between the layers of metal foil. The positive lead 55 from the condenser passes through a small hole in the shoulder 51 and is wound around and soldered to the electrode 14. The negative lead 56 lies in a groove 57 in the shoulder 52 and along the outer surface of the portion 44 of insulator 40 in order to provide a ground connection to barrel 10 in the assembled device.

The electrometer-condenser unit is completed by a cylindrical sleeve 60 of insulating material such as polystyrene, which is formed with an annular shoulder 61 near its inner end to receive the outer end surface of the shoulder 51 of insulator 40 and which has its outer surface in two sections of different diameters for insertion within housing 30 and barrel 10, respectively. The sleeve 60 is beveled adjacent shoulder 61 as shown at 62, and the adjacent end of the insulator is formed of reduced diameter to provide a comparative deep annular groove 63 which forms an extended surface leakage path from the electrode 14, tending to reduce the loss of electrostatic charge. The outer end of sleeve 60 fits into a groove 64 in the shoulder 52, and the sleeve and insulator are preferably secured together at this point, which may readily be done by means of a solvent bond with acetone or another suitable mutual solvent.

Before the electrometer and insulator are assembled in the housing 30, the fiber 15 is provided with a suitable conducting coating, as by sputtering with platinum or other suitable metal. Also, if no precautions are taken, the presence of the wire electrode 14 will cause excessive photoelectric effect in the lower X-ray region. Therefore, in order to control secondary radiation from the electrode 14 resulting from the photoelectric effect, and thus to obtain effectively uniform radiation sensitivity in the instrument as a whole over substantially the entire X- and gamma ray spectrum, as much of the surface of the electrode as possible is coated with a suitable material of low atomic number, satisfactory results having been obtained by painting the electrode with a suspension of colloidal graphite in a carrier which will adhere to the electrode, such as the rubbery material sold under the trade name "Insulex No. 22."

The surface of ionization chamber 31 should be conducting and have no dead spots, and it should be grounded to the barrel 10. The nonconducting housing 30 is accodingly provided with a coating on the inner surface of the chamber 31 which is sufficiently conductive to remove positive ions formed in chamber 31 by radiation, such coating being continuous to its outer surface to assure electric contact with the barrel 10. The actual conductivity required for this coating is relatively low, tests indicating that a resistance of $10^8$ ohms is not too high, and satisfactory results have been obtained by dipping the housing in a suspension of colloidal graphite in a solvent for the material composing the housing, such as acetone in the case of polystyrene. The solvent softens the surface of the housing sufficiently to cause the graphite to be imbedded therein and thus to form the desired conducting coating, and loose particles remaining on the surface of the housing may then be readily removed by polishing in a lathe.

It has been found that if this conducting coating covers the entire housing 30, particles of the graphite may become detached during assembly of the device and enter the open part of the barrel between the objective lens 20 and the scale disk 24, where they tend to obscure proper reading of the instrument. Accordingly, it is desirable to limit the painting or dipping of the housing to the portion extending from its right-hand end in the drawing to approximately the level of the passage 32. Particles of the graphite which may be detached from the housing during use of the instrument can be prevented from interfering with its operation by coating the wall of the chamber 31 and also the wall of the barrel between the lens 20 and the disk 24 with a suitable conducting grease such as a silicone grease mixed with graphite to a sufficient extent to become conducting.

If desired, the housing 30 may be formed of a material which itself possesses the desired conductivity, such as a phenolic resin containing a conducting material or a molded mixture of graphite and methyl methacrylate. As pointed out above, however, care should be taken to utilize materials of appropriate average atomic numbers in order to control secondary radiation in the ionization chamber resulting from photoelectric action in the presence of the radiation to be measured, which would cause the device to read too high in the lower X-ray energy region, e. g. about 100 kev. Similarly if the barrel 10 is formed of a suitably strong plastic material which possesses the desired conductivity and freedom of passage for radiation, the housing 30 may be molded integrally with the barrel or separately formed as shown, and the ends of the barrel may be post-formed, i. e., formed after assembly of the other parts therein, in a manner comparable to the peening of the ends of the metal barrel to seal the parts in assembled relation.

In assembling these parts, the sleeve 60 and insulator 40 are cemented together as described before the parts are mounted in the housing 20. The electrometer end of this unit is then inserted in housing 30 until the inner end of sleeve 60 seats on the shoulder 36, and the sleeve is formed with its inner portion of reduced diameter to provide an annular shoulder 65 which abuts the outer end of housing 30 when the parts are in the proper relative positions. The insulator unit and housing 30 may be cemented together as by a solvent bond if desired, but subsequent adjustment of these parts with relation to the scale 25 is facilitated if the sleeve 60 is not cemented to the housing but is formed to have a sufficiently snug fit in the housing to hold these parts together while still permitting their removal from the barrel as required for adjustment before they are sealed in place.

After the electrometer unit is mounted in housing 30, the objective lens 20 is inserted from the opposite end of the housing 30 in the passage 34, and before the lens is secured in position, the fiber 15 may be adjusted as required into proper position in the field of lens 20 by inserting a suitable tool through an opening 66 provided in the wall of chamber 31 and manipulating the electrode 14. This hole is shown as sealed with cellulose sealing tape 67 prior to insertion of the unit in barrel 10, and a peripheral groove is formed in the surface of housing 30 to receive this tape, which also serves to shield the hole 66 against the passage of secondary electrons emitted from the wall of barrel 10.

The objective lens 20 is then adjusted into accurately focused relation with the fiber 15 to position the loop of the fiber in the focal plane of the lens. This focusing is accomplished by means of an annular spacer 70 inserted between the lens and the shoulder 71 at the inner end of passage 34. This spacer also forms an optical aperture for the microscope aligned with and of the same diameter as the passage 32, and it has been found desirable to have available a plurality of these spacers of different thicknesses, ranging from 0.010 to 0.020 inch, which may be used selectively in the assembly of each instrument to adjust the lens to the proper spacing with respect to the fiber 15.

After a selected spacer 70 of the proper thickness is in place, the lens 20 is secured and sealed in position by means of a rubber O-ring 72 and a sleeve 73 of polystyrene or other suitable plastic, which is compressed against the O-ring 72 and secured in position by a solvent bond with the inner wall of passage 34. In this way, the lens 20 is held securely in position even under conditions of substantial temperature ranges, since differences in thermal expansion between the lens 20 and the housing 30 are compensated for by the O-ring 72, which maintains pressure on the lens at all times to hold it firmly in position.

It is thus assured that the lens 20 and the electrometer fiber 15 will remain in accurately focused relation unaffected by temperature changes, since with the housing 30 and the insulator 40 and sleeve 60 formed of the same plastic material, or of different materials having the same coefficient of expansion, and secured together by a solvent bond, there will be no differential expansion of these parts. Also, with the insulator 40 and sleeve 60 of substantial length as shown and with the resulting large area of their peripheral surfaces permanently secured to and in closely fitting relation with the inner wall of housing 30 and barrel 10, a firm and rigid support is provided for the electrometer, minimizing the possibility of permanent deflection of the fiber under shock. Assurance is also provided against the possibility of the loop portion fiber 15 catching on or being accidentally forced through the adjacent large loop portion of electrode 14, since the ends of the fiber extend around the outside of the offset portions of electrode 14 to which they are secured, and the fiber thus crosses the wire of the electrode twice at relatively large angles.

A diaphragm assembly indicated generally at 75 is mounted in the outer end of barrel 10 to seal the barrel and to support the charging pin 77 for the electrometer. This assembly includes a sleeve portion 80 and a flexible diaphragm portion 81 molded integrally therewith, and it also includes a central portion 82 of increased thickness which surrounds the charging pin 77, the pin being provided with a circumferential groove as shown into which the material of the diaphragm is molded to form an interlock construction. At the outer end of this assembly is a supporting ring 85 of aluminum or other suitable material, which is provided with a circumferential groove 86 into which the material of the sleeve portion 80 of the diaphragm unit is integrally molded. This ring 85 supports the outer end of the sleeve 80 when the outer end of the barrel 10 is peened over at 88 to secure these parts in place, and it also aids in maintaining the seal between sleeve 80 and the barrel in the event of differential transverse expansion of the parts under changing conditions of temperature.

It is desirable to have the diaphragm assembly 75 of such properties as to assure hermetic sealing of the barrel while still providing for establishing contact of the charging pin 77 with the outer end 41 of the electrode 14. In addition, the diaphragm 81 should be adequately light transmitting to admit the desired light for illumination of the electrometer and scale, and it should possess sufficient insulating properties to prevent short circuiting of the source of charging voltage. Satisfactory results from both of these standpoints have been obtained from the diaphragm and sleeve molded from transparent cellulose acetate butyrate, and with the pin 77 formed of stainless steel and grooved as shown to provide for molding the center portion of the diaphragm in interlocked relation therewith. However, since the butyrate does not wet stainless steel, additional sealing is provided adjacent the pin by applying a coating of a suitable flexible adhesive such as Glyptal to the junction of the pin with diaphragm portion 82.

The shape of the diaphragm 81 as shown, with a single annular convolution between the sleeve 80 and the central portion 82, has been found helpful in reducing undesirable light refractive effects. In addition, it will be noted that the diaphragm is substantially thicker adjacent its central portion 82 than adjacent its peripheral connection with the sleeve portion 80, for example a thickness range from a maximum of the order of 0.011 inch to a minimum of the order of 0.005 inch for a diaphragm assembly approximately 0.375 inch in diameter. With this variation in thickness, flexing of the diaphragm takes place primarily in its outer portions, thus protecting the Glyptal coating against cracking such as might result from excessive flexing of the inner portion of the diaphragm. Also, with the flexing of the diaphragm taking place primarily at its periphery, less total flexing is required for a given amount of movement of pin 77, thus reducing wear on the diaphragm as a whole and prolonging its useful life. With these proportions of the diaphragm and associated parts, the pin 77 can be moved from its retracted position shown in Fig. 2 through a distance of approximately 0.025 inch with a pressure of about 2.5 to 7 pounds.

At the eyepiece end of the device, the barrel 10 is counterbored to provide a portion of larger diameter terminating in an annular shoulder 90 which forms a seat for the scale disk 24, and it has been found desirable to secure the disk in position by applying a suitable adhesive to the shoulder 90 and the adjacent portion of the inner wall of the barrel before the disk is mounted in place, satisfactory results having been obtained by using B-7 Acryloid as the adhesive in the case of a glass disk 24 and aluminum barrel 10. A washer 91 is mounted adjacent disk 24 to form an optical aperture, and an aluminum spacer sleeve 92 is mounted between this washer and the eyepiece lens 22.

The outer end of sleeve 92 is provided with a circumferential groove 93 which receives an O-ring 95 against which the lens 22 is seated. An aluminum eyepiece ring 96 is positioned adjacent the outer surface of the lens, and these parts are shown as held in assembled relation by peening the outer end of barrel 10 as indicated at 97. Thus with the parts properly proportioned as shown, the O-ring 95 is compressed against sleeve 92 and the wall of barrel 10 to seal the interior at this end of the barrel and to hold lens 22 firmly under pressure preventing relative movement of these parts under conditions of differential expansion, and the eyepiece ring 96 holds lens 22 in recessed relation with the outer end of barrel 10 to protect the lens against abrasion or other injury in use.

In assembling the device, the housing and its associated parts may be mounted in the barrel 10 first, since if they require removal before they are finally installed in the barrel, they can be readily pushed out through the open end of the barrel before the eyepiece and scale are in place. The annular shoulder 99 within the barrel serves as a stop for positioning the inner end of housing 30, and a spring steel washer 100 formed with a cylindrically curved shape as shown in Fig. 4 is inserted between the outer end of the insulator portion 44 and the diaphragm assembly 80, following which these parts are secured in position by peening the outer end of the barrel at 88, additional sealing being provided by applying a coating of B-7 Acryloid between the end of the barrel and sleeve 80 and permitting the coating to dry partially before the peening operation. The washer 100 serves as an optical aperture, and it also exerts sufficient pressure longitudinally of the device to retain these parts firmly in assembled relation and thus to prevent relative movement of the parts in the event of differential expansion thereof under condition of temperature change. The eyepiece and its associated parts are inserted and held in place as already described, the scale being adjusted during insertion into the proper alignment of its calibrations with the loop portion of the fiber 15.

It will be apparent that with the charging pin 77 located in the center of the barrel at the substantially thickened portion 82 of the diaphragm 81, a considerable amount of the light which would normally be employed by illuminating the electrometer is cut off. The lens surface 45 at the outer end of insulator 49 compensates for this loss of light by acting as a condensing lens for the hollow tube of light rays transmitted by the diaphragm 81 and washer 100 and directs these rays sufficiently inwardly and along the axis of the device for adequate illumination of the fiber 15 for viewing through the microscope.

In the operation of the device, the electrometer is first charged by pressing the outer end of charging pin 77 in contact with a suitable external source of voltage and then forcing the pin inwardly by deflection of the diaphragm 81 with the outer end 41 of electrode 14. The device is so adjusted that when fully charged, the image 15a of the fiber 15 will coincide with the zero mark on the scale 25, a suitable charging voltage being 150 volts in an instrument of the proportions and capacity given above. When the device is removed from the charging source, the diaphragm retracts to remove pin 77 out of contact with the electrode, and with the capacity of the device as high as described, it has been found unnecessary to provide an electrostatic shield for preventing deflection of the fiber.

After the instrument has thus been charged, it is ready for use and may be carried in the pocket or otherwise attached to the clothing or person of a user working in the presence of X- or gamma radiation. Ionization of the air within chamber 31 by the radiation causes neutralization of the charge on the electrometer, and the resulting movement of the fiber 15 registers this alteration in charge on the scale 25 in proportion to the total quantity of ionization. At the same time, positive ions produced in the chamber 31 are removed by the conducting surface of the housing 30 to prevent them from interfering with the desired accuracy of the device.

As pointed out, the sensitivity of the device, and accordingly the range over which it will measure, can be changed by variation of any of the determining factors listed, namely the volume of the ionization chamber, the number of volts required for full scale movement of the electrometer fiber, and the capacity of the electrometer system. For example, with the ionization chamber approximately 2 cc. in volume and with the fiber and scale correlated to require a drop of 66 volts for full scale movement of the fiber, the device will measure up to 10 roentgens with a capacity of 60 mmfd. for the condenser 50. This range can be changed by multiplying it and the capacity by the same factor. Thus in order to obtain a range of 250 roentgens, the capacity should be increased by a factor of 25 and the graduations of scale 25 may be varied as desired in accordance with the range of this instrument.

It will thus be seen that the invention provides an exposure measuring device which is strong and rugged from the standpoint of resistance to shock and to varying conditions of temperature and moisture while at the same time being adequately small and light for convenient carrying about the person of the user. In addition, with the charging pin protected as shown by its recessed position within the open end of the barrel, there is little danger of accidental movement of the pin into such contact with the electrode 14 as to cause accidental discharge of the electrometer, and the device accordingly does not require a separate removable cap at this end of the barrel.

Reference is made to copending applications of O. G. Landsverk and L. E. Rasmussen, Serial Nos. 131,091 and 131,093, filed December 5, 1949, for X-Ray Apparatus and assigned to the same assignee as this application.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A device for measuring exposure to radiation over a relatively high range comprising a supporting barrel, a housing within said barrel forming an ionization chamber, an electrometer within said ionization chamber, an insulator supporting said electrometer within said housing, means securing said insulator in fixed relation with said housing to provide a firm and rigid support for said electrometer, a condenser mounted within said barrel externally of said ionization chamber, means connecting said condenser with said electrometer and said barrel to increase the capacity of said electrometer, a microscope and scale mounted in said barrel for observing and measuring the position of said electrometer, means for sealing the ends of said barrel, said sealing means being light transmitting to provide light within said barrel for illuminating said electrometer, said condenser being of tubular configuration to transmit said light through the central portion thereof, said insulator being of light transmitting material to transmit said light to said electrometer within said ionization chamber, and means operable from outside said barrel through said sealing means for applying a charge to said electrometer.

2. A device for measuring exposure to radiation over a relatively high range comprising a supporting barrel, a housing within said barrel forming an ionization chamber, an electrometer within said ionization chamber, an insulator supporting said electrometer within said housing, said insulator including a spool-shaped portion spaced from the interior of said ionization chamber, a tubular condenser mounted on said spool-shaped portion of said insulator and connected with said electrometer and said barrel to increase the capacity of said electrometer, a microscope and scale mounted in said barrel for observing and measuring the position of said electrometer, means for sealing the ends of said barrel, said sealing means being light transmitting to provide light within said barrel for illuminating said electrometer, said insulator being of light transmitting material to transmit said light through said tubular condenser to said electrometer within said ionization chamber, and means operable from outside said barrel through said sealing means for applying a charge to said electrometer.

3. A device for measuring exposure to radiation over a relatively high range comprising a supporting barrel, means forming an ionization chamber within said barrel, an electrometer within said ionization chamber, insulating means within said barrel supporting said electrometer, said insulating means including an elongated portion of lesser diameter than the inner diameter of said barrel, a tubular condenser mounted on said elongated portion of said insulating means, means connecting said condenser with said electrometer and said barrel to increase the capacity of said electrometer, a sleeve of insulating material received over said insulator and enclosing said condenser, means sealing said sleeve to said insulating means, said sleeve including portions of different diameter adapted to be received in closely fitting relation within said ionization chamber and said barrel respectively to cooperate with said insulating means in forming a firm and rigid support for said electrometer, and means for applying a charge to said electrometer.

4. A device for measuring exposure to radiation over a relatively high range comprising a supporting barrel, a scale and an eyepiece mounted in said barrel, an electrometer unit adapted to be assembled separately from said barrel for insertion therein and including a housing forming an ionization chamber, an insulator, means securing said insulator within said chamber, an electrometer carried by said insulator within said chamber, said insulator including an elongated portion of lesser diameter than the inner diameter of said chamber to provide an annular space between said insulator and said barrel, a condenser mounted on said insulator in said space, means for retaining said condenser in mounted relation with said insulator, means connecting said condenser with said electrometer, means effective upon insertion of said unit in said barrel to connect said condenser with said barrel, an objective lens mounted in the opposite end of said housing from said insulator in focused relation with said electrometer, means for sealing said lens in said housing in said focused relation, and means for retaining said electrometer unit in said barrel with said objective lens in cooperative relation with said scale and eyepiece for observing and measuring the position of said electrometer.

5. A device for measuring exposure to radiation over a relatively high range comprising a supporting barrel, means forming an ionization chamber within said barrel, an electrometer within said ionization chamber, insulating means within said barrel supporting said electrometer, said insulating means including an elongated portion of lesser diameter than the inner diameter of said barrel, a tubular condenser mounted on said elongated portion of said insulating means, means connecting said condenser with said electrometer and said barrel to increase the capacity of said electrometer, transparent means for sealing the end of said barrel outwardly of said insulating means while transmitting light to said electrometer, a member operable through said sealing means for applying a charge to said electrometer, said charging member being opaque and cutting off a portion of the light transmitted by said sealing means to leave a tube of light rays propagated towards said electrometer, and means forming a lens surface between said sealing means and said condenser for concentrating upon said electrometer the light transmitted by said sealing means.

6. A device for measuring exposure to radiation over a relatively high range comprising a supporting barrel, means forming an ionization chamber within said barrel, an electrometer within said ionization chamber, insulating means within said barrel supporting said electrometer, said insulating means including an elongated portion of lesser diameter than the inner diameter of said barrel, a tubular condenser mounted on said elongated portion of said insulating means, means connecting said condenser with said electrometer and said barrel to increase the capacity of said electrometer, transparent means for sealing the end of said barrel outwardly of said insulating means while transmitting light to said electrometer, a member operable through said sealing means for applying a charge to said electrometer, said charging member being opaque and cutting off a portion of the light transmitted by said sealing means to leave a tube of light rays propagated towards said electrometer, and means on the outer end of said elongated portion of said insulating means forming a lens surface for concentrating upon said electrometer the light transmitted by said sealing means, said insulating means being transparent to transmit said concentrated light to said electrometer.

7. A device for measuring exposure to radiation over a relatively high range comprising a supporting barrel, means forming an ionization chamber within said barrel, an electrometer within said ionization chamber, a transparent insulator for supporting said electrometer and having a portion of said electrometer extending centrally therethrough to form a charging contact, means for supporting said insulator within said barrel, said insulator having a circumferential groove therein giving a spool-like shape thereto, a tubular condenser mounted in said groove, means connecting said condenser with said electrometer and said barrel to increase the capacity of said electrometer, a transparent flexible diaphragm forming a seal between said insulator and the adjacent end of said barrel, a charging member carried by said diaphragm and positioned substantially centrally thereof for movement therewith into charging engagement with said contact, said charging member being opaque and cutting off a portion of the light transmitted by said sealing means to leave a tube of light rays propagated toward said electrometer, means forming a lens surface on the outer end of said insulator and of large diameter than the inner diameter of said condenser for concentrating upon said electrometer the light transmitted by said diaphragm, and a microscope and scale mounted within said barrel for observing and measuring the position of said electrometer.

OLE G. LANDSVERK.
LEONARD E. RASMUSSEN.

References Cited in the file of this patent

UNITED STATES PATENTS

| Number | Name | Date |
|---|---|---|
| 2,594,660 | Lauritsen | Apr. 29, 1952 |
| 2,601,637 | Rose et al. | June 24, 1952 |

OTHER REFERENCES

Landsverk: Atomic Energy Commission Document MDDC–395, December 13, 1945, 8 pages.

Atomic Energy Commission Document MDDC–396, April 22, 1946, pages 3 and 5.

Atomic Energy Commission Document MDDC–886, January 17, 1947, 4 pages.